United States Patent
Liu et al.

(10) Patent No.: US 7,356,813 B2
(45) Date of Patent: Apr. 8, 2008

(54) SYSTEM AND METHOD FOR OPTIMIZING A PROGRAM

(75) Inventors: Shin-Ming Liu, Saratoga, CA (US); Dmitry Mikulin, San Mateo, CA (US); Muralitharan Vijayasundaram, Santa Clara, CA (US); David Xinliang Li, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 10/255,748

(22) Filed: Sep. 26, 2002

(65) Prior Publication Data

US 2004/0064809 A1    Apr. 1, 2004

(51) Int. Cl.
G06F 9/44 (2006.01)
G06F 9/45 (2006.01)

(52) U.S. Cl. .................. 717/163; 717/154
(58) Field of Classification Search ........ 717/136–146, 717/156–159, 162–167, 154; 719/331
See application file for complete search history.

(56) References Cited

U.S. PATENT DOCUMENTS 5,920,723 A * 7/1999 Peyton et al. ............... 717/157
6,131,189 A * 10/2000 Chow et al. ................ 717/141
6,675,379 B1 * 1/2004 Kolodner et al. ........... 717/155

\* cited by examiner

Primary Examiner—Eric B. Kiss
Assistant Examiner—John Romano

(57) ABSTRACT

Disclosed are systems and methods for optimizing a program.

25 Claims, 7 Drawing Sheets

SYSTEM AND METHOD FOR OPTIMIZING A PROGRAM

BACKGROUND

Whole program analysis enables an aggressive form of optimization that is applied on a full program basis. The goal of whole program analysis is to analyze substantially the entire program during the compilation phase to obtain the most effective optimization possible. One difficulty with whole program analysis is that the compiler used to compile the program normally does not have access to the entire program and, therefore, all of the information it needs to optimize the program. Instead, the compiler typically only "sees" the program files that are provided to the compiler by the programmer (i.e., user). Accordingly, the compiler normally cannot take into account any information contained in, for example, previously compiled object files of a library or a separate load module. Without having access to this information, the compiler cannot identify all the different relationships between the various portions of the program, and therefore cannot perform the most efficient optimization.

As an example, the existence of all alias relationships normally cannot be determined where libraries or real object files already exist that are unknown to the compiler. Because of this fact, it cannot be determined with any certainty whether a given global variable may be accessed through a pointer, i.e. whether the variable's address is exposed or not. Therefore, the global variable must be reloaded into memory each time it is used if there is an indirect memory store instruction before this use, thereby requiring execution time that otherwise would not be necessary if the compiler could confirm that the global variable is not so exposed.

In addition, a compiler normally cannot determine whether a given global variable will be modified by an existing library or other program feature that the compiler cannot see. Accordingly, a global variable having a given, unchanging value may need to be referenced with an address each time it is encountered even though it could simply be replaced with a constant. Such referencing not only slows execution speed, but further wastes memory space in having to store the instructions and the address related to the variable.

Another piece of information relevant to global variables that normally cannot be determined by a compiler is whether an assigned variable is not ever used in the program. Without this information, unused variables and instructions that pertain to them cannot be removed from the program, again slowing execution speed and wasting memory space.

In addition to the optimization limitations pertinent to global variables, conventional systems furthermore cannot facilitate external function call optimization. In particular, the compiler typically cannot determine whether a given function is defined in an existing library or other program feature and, if so, whether its function call is preemptible. If it were ascertainable that a given function call is preemptible, the compiler could optimize the program by inlining the function call stubs to reduce the number of references necessary to branch to the function, thereby increasing execution speed.

In recognition of the limited amount of optimization that is obtainable using conventional techniques, several solutions have been proposed. In one such solution, aggressive assumptions are made as to the nature of the program that is to be compiled and are applied by the compiler during the compilation process. The problem with this approach, however, is that it is only as accurate as the assumptions that are made. Accordingly, if the assumptions are wrong, the program may not be optimized to its greatest extent or, in some cases, compilation errors will be encountered.

In another solution, attempts are made to approximate whole program analysis by manually creating a database for various libraries that contain object files. The compiler is configured to query the database for information about the object files and, presumably, uses this information to optimize the program. This approach fails to provide true whole program analysis, however, in that the database is built when the various program libraries are built and therefore can only provide information as to known system libraries. Moreover, this solution is undesirable from an efficiency standpoint in that it is manually intensive.

SUMMARY

Disclosed are systems and methods through which program optimization may be achieved. In one embodiment, a method includes analyzing a program to gather information regarding global variables used in the program, providing the information gathered about the global variables to a compiler that is to compile the program, and compiling the program with the compiler in view of the gathered information so as to optimize the program.

In another embodiment, a method includes analyzing a program to gather information regarding a call to a function of the program, providing the information gathered about the function call to a compiler that is to compile the program, and compiling the program with the compiler in view of the gathered information so as to optimize the program.

In a further embodiment, a method includes translating source objects of the program into intermediate objects using a compiler, providing the intermediate objects to a linker, analyzing portions of the program about which the compiler has no knowledge using the linker, updating a global symbol table with information obtained during the analysis, passing the intermediate objects back to the compiler, providing information contained in the linker global symbol table to the compiler, and translating the intermediate objects into real objects with the compiler in reference to the information contained in the linker global symbol table so as to optimize the program.

In one method, a system includes linking means for analyzing the program to determine information that can be used to optimize the program, compiling means for compiling the program in view of the information determined by the linking means, and feedback means for providing the information determined by the linking means to the compiling means for reference during compilation so that the program can be optimized.

In another embodiment, a system includes a compiler configured to translate source objects of the program into intermediate objects, a linker configured to analyze portions of the program about which the compiler has no knowledge to derive information relevant to program optimization, and a feedback plug-in that includes interfaces that can be called by the compiler and the linker, the feedback plug-in facilitating communication of the derived information to the compiler.

In yet another embodiment, a system includes logic configured to translate source objects of the program into intermediate objects, logic configured to translate intermediate objects into real objects, logic configured to analyze the program to obtain information that may be used to optimize the program, and logic configured to facilitate communication of the obtained information to the logic configured to translate the intermediate objects into real objects.

In addition the disclosure relates to a plug-in for facilitating program optimization. In one embodiment, the plug-in includes a plurality of interfaces that can be called by function pointers of a compiler and a linker, a first interface facilitating communication to the compiler that a first pass of the linker has been completed to thereby indicate that whole program analysis has been performed to collect information relevant to program optimization in a linker global symbol table, a second interface facilitating communication to the linker to provide the collected information to the compiler, wherein the compiler can then compile the program using the information collected from the linker so as to optimize the program.

BRIEF DESCRIPTION OF THE DRAWINGS

The disclosed systems and method can be better understood with reference to the following drawings. The features in the drawings are not to scale.

DETAILED DESCRIPTION

Disclosed are systems and methods for performing whole program analysis. Through this analysis, more effective optimization of a source program can be achieved during the compilation and linking phases of the program translation process. With the disclosed systems and methods, feedback is provided from the linker to the compiler to provide the compiler with more information about the program during compilation. As is discussed in greater detail below, this feedback is made possible by the provision of a set of interfaces that permit the compiler and the linker to communicate with each other. In that the linker has access to the entire program, more effective optimization can be obtained.

Figure 5:
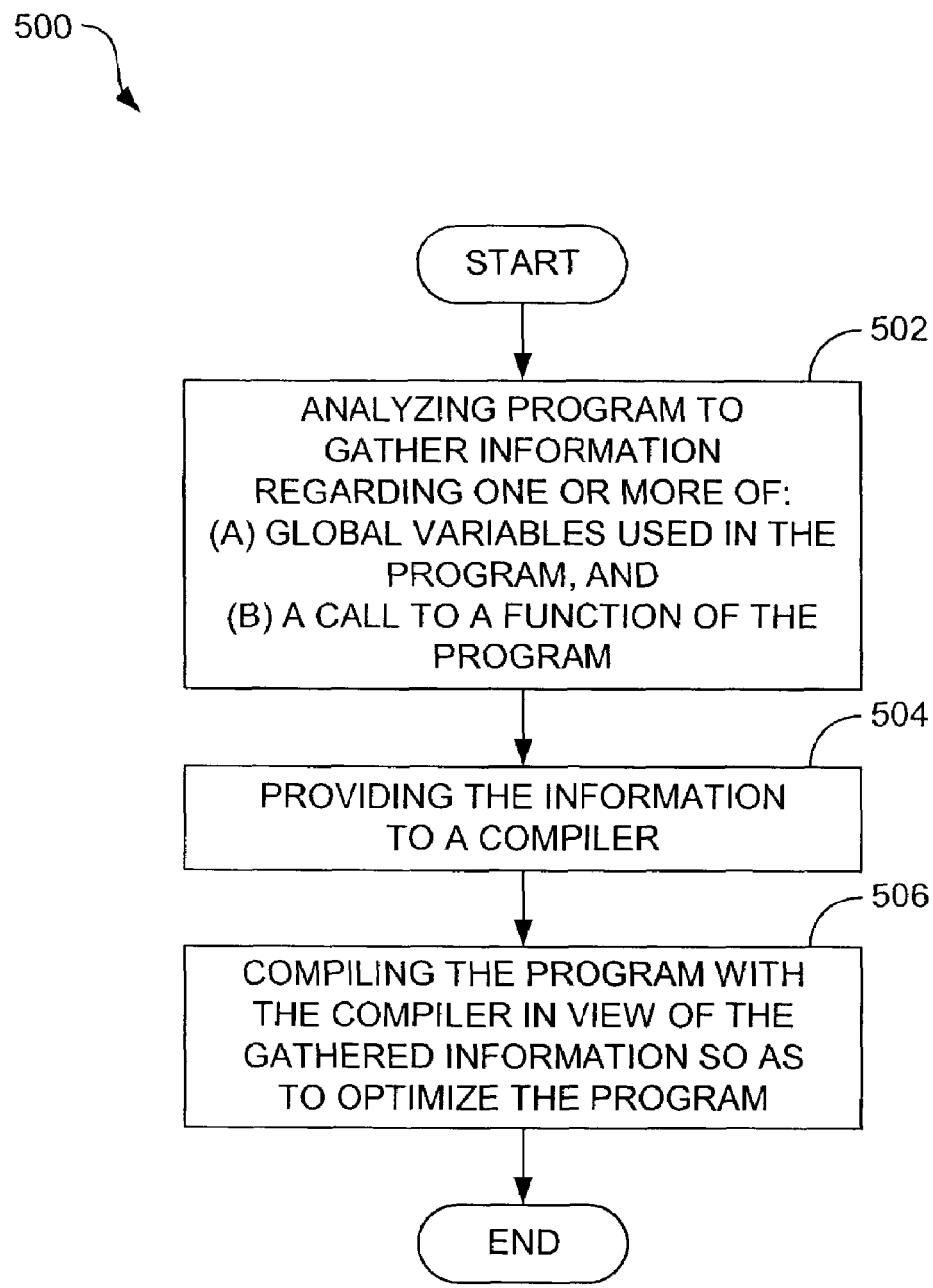
FIG. 5 is a flow diagram that illustrates a method for optimizing a program.

In one aspect, global address exposure analysis may be performed. In another aspect, global constant variable recognition can be performed. In a further aspect, global dead store elimination can be performed. In yet another aspect, external function call analysis can be performed. As will be apparent from the following, information regarding each of these analyses may be provided to the compiler and the compiler may compile the program in view of the information to optimize the program as shown in FIG. 5. The information may be provided to the compiler in a linker global symbol table. Each of the different types of analyses, and the optimizations they enable, are described in detail below.

Although systems are described in detail herein, they are provided for purposes of illustration only and various modifications are feasible. After the description of the example systems, examples of operation of the systems are provided to explain the manners in which optimization can be facilitated.

Figure 1:
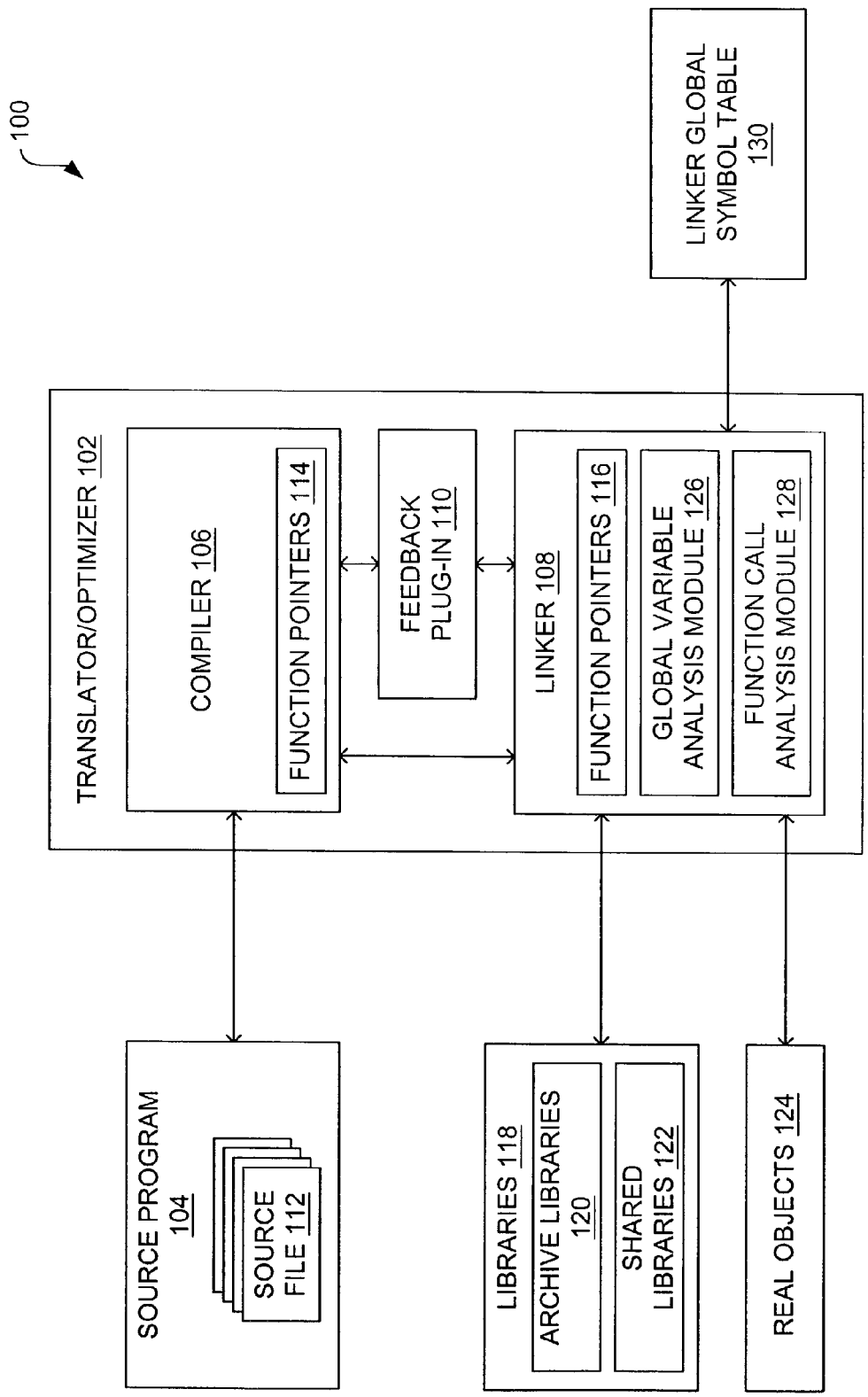
FIG. 1 is a block diagram illustrating an example system for providing whole program analysis.

With reference to FIG. 1, illustrated is an example system 100 with which whole program analysis can be achieved. As indicated in FIG. 1, the system 100 comprises a translator/optimizer 102 that is used to translate and optimize a source program 104 into an object program in machine code. The translator/optimizer comprises a compiler 106, a linker 108, and a feedback plug-in 110, which facilitates communications between the compiler and the linker. The compiler 106 is configured to translate source files 112 of the source program 104 into intermediate objects and object files, and includes a set of function pointers 114 that, as is discussed in greater detail below, are used to select interfaces of the feedback plug-in 110 used to communicate with the linker 108.

The linker 108 is configured to link the various object files compiled by the compiler 106 into an executable program. As shown in the figure, the linker 108 includes its own set of function pointers 116 that, as is discussed below, are used to select interfaces of the feedback plug-in 110 to communicate with the compiler 106. In that the linker 108 views the entire program, the linker is capable of gathering information from various sources that are unknown to or inaccessible by the compiler 106. Accordingly, the linker 106 may, for example, gather information contained within various program libraries 118 (including archive libraries 120 and shared libraries 122) and real objects 124. As is further shown in FIG. 1, the linker 108 also includes a global variable analysis module 126 that is used to collect various information about global variables (i.e., variables that may be referenced by more than one source module) used in the program, and a function call analysis module 128 that is used to collect information about function calls used in the program. Although specific "modules" have been identified, it is to be understood that their functionality may be spread over two or more separate portions of code that provide the stated functionality. Operation of the modules is discussed in relation to FIGS. 4A-4C.

As is further indicated in FIG. 1, the system 100 also includes a linker global symbol table 130 that is created and maintained by the linker 108 and which, as described below, can be used to provide various information pertinent to program optimization to the compiler 106 after a first pass of the linker has been completed.

The feedback plug-in 110 comprises a dynamically loadable library (DLL) that contains the various interfaces (application programming interfaces (APIs)) used by the compiler 106 to access the linker 108, and vice versa. The plug-in 110 is typically formed as a separate module that is dynamically loaded by the linker 108. Once loaded, the various interfaces are "hooked" into the linker 108 at strategic points during the linking process to override or supplement standard linker behavior and to permit insertion of dynamically-generated information into the linking process. During operation, the plug-in 110 can select the events it will see. As each event is delivered to the plug-in 110, the linker 108 provides a set of callback interfaces that the plug-in can use to observe or modify the current state of the linking process.

When the plug-in 110 is loaded, the linker 108 invokes an initialization routine in the plug-in. This routine registers a plug-in extension with the linker 108, selects the set of events that should be delivered, and supplies a table of pointers to functions that implement the plug-in interfaces. During the first link pass, the events that can be delivered to the plug-in include opening of an input file and closing of an input file. If the input file type is supported by the plug-in 110 rather than the linker 108, the linker delivers a "first-pass scan" event to the plug-in.

At the end of the first link pass, the linker 108 delivers an "end first pass" event to the plug-in 110. At this point, the plug-in 110 has the opportunity to contribute additional first pass data to the link. At the conclusion of the end-of-pass processing after pass 1 and immediately prior to the second link pass, the linker 108 delivers a "begin second pass" event to the plug-in 110. During the second link pass, the events that can be delivered to the plug-in 110 include opening of an input file and closing of an input file. If the input file type is supported by the plug-in 110 rather than the linker 108, the linker delivers a "second-pass scan" event to the plug-in. Finally, at the conclusion of the second pass, the linker 108 delivers an "end second pass" event to the plug-in 110.

During plug-in extension loading, the linker 108 reads a plug-in configuration file that typically comprises a simple line-oriented ASCII file that contains three fields separated by white space: a plug-in identifier, a plug-in type, and a file name. The plug-in identifier is a unique identifier associated with the plug-in 110 for use in command-line options. The plug-in type indicates how the plug-in 110 should be loaded: always, only when a command-line option invokes it, or only when an unknown input file type is encountered. The linker 108 loads the plug-in extension with an appropriate function, such as dlopen(). The linker 108 then uses dlsym() to find an entry point with the name init, and calls it. This entry point can have an interface in the form: plug_in_vector_t* init(linker_vector_t *linker_vector). The types plug_in_vector_t and linker_vector_t define the tables of function pointers that are used for all interface calls from the linker 108 to the plug-in 110, and from the plug-in to the linker, respectively. The init routine returns a pointer to its plug_in_vector_t structure. The first member of this structure is a mask indicating which events should be delivered to the plug-in 110. The remainder of the members are pointers to functions that handle each event. Function pointers corresponding to nondelivered events may be NULL, and all others must be valid.

The various interfaces that may be used by the linker 108 will now be discussed. Several first-pass events interfaces can be called to deliver events that occur during the linker's first pass over the input files. In the first pass, the linker 108 collects symbol table and section size information, and it makes a preliminary scan over the relocations to collect information about short format procedure calls and references through the linkage tables. When first-pass events are delivered, error-reporting, file handle, linker global symbol table, and first-pass callback interfaces are available. Just before the first pass begins, the linker 108 delivers a beginning-of-pass event to the plug-in through the pass1_begin interface: void pass1_begin(). Whenever an input file is opened during the first pass, an event is delivered to each plug-in 110 through the pass1_open interface: void pass1_open(file_handle_t handle). The handle can be used for obtaining the file name and determining the type of input file, and it may be saved for use later in the first pass. For example, the plug-in 110 may keep a list of the handles of archive libraries, and selectively re-scan them at the end of the first pass.

If an input file is associated with the particular plug-in 110, an event is delivered to the plug-in through the pass1_scan interface: void pass1_scan(file_handle_t handle). The handle can be used for reading the contents of the file. At this point, processing for a typical object file would deliver information to the linker including, for example, central processing unit (CPU) type, revision level, and extension bits required by object code in the module; global symbols defined in and referenced by the module; names of local symbols defined in the module; names and sizes of sections in the module, with relocations for each section; and note sections. If the plug-in 110 has any object code or data to contribute to the link, it may use the callback interfaces to deliver this information in response to this event, or it may choose to wait until the end of the first pass.

Whenever an input file is closed during the first pass, an event is delivered to the plug-in 110 through the pass1_close interface: void pass1_close(file_handle_t handle). At the end of the first pass, before any between-pass processing has begun, the linker 108 delivers an end-of-pass event to the plug-in 110 through the pass1_end interface: void pass1_end (). The plug-in 110 may at this point deliver symbol and section information to the linker 108, and it may also initiate the first-pass processing of additional object files.

Several second pass events interfaces may also be called to deliver events that occur during the linker's second pass over the input files. When second-pass events are delivered, error-reporting, file handle, linker symbol table, and second-pass callback interfaces are available. Just before the second pass begins, the linker 108 delivers a beginning-of-pass event to the plug-in 110 through the pass2_begin interface: void pass2_begin(). Whenever an input file is opened during the second pass, an event is delivered to the plug-in 110 through the pass2_open interface: void pass2_open(file_handle_t handle). If an input file is associated with the plug-in 110, an event is delivered only to the plug-in through the pass2_scan interface: void pass2_scan(file_handle_t handle). The handle can be used for reading the contents of the file. At this point, processing for a typical object file would deliver information to the linker 108 including all local symbols defined in the module and the contents of each section in the module. If the plug-in 110 has any object code or data to contribute to the link, it may use the callback interfaces to deliver this information in response to this event, or it may choose to wait until the end of the second pass.

Whenever an input file is closed during the second pass, an event is delivered to the plug-in 110 through the pass2_close interface: void pass2_close(file_handle_t handle). At the end of the second pass, the linker 108 delivers an end-of-pass event to the plug-110 in through the pass2_end interface: void pass2_end(). The plug-in 110 may at this point deliver local symbols and section contents to the linker 108, and may also initiate the second-pass processing of any additional object files that the plug-in introduced at the end of the first pass.

Linker callback interfaces are provided by the linker 108 for use by the plug-in extension. The callback interfaces are grouped into various sets that may be used by the plug-in 110, varied by the type of event delivered. The availability of each callback set is listed explicitly for each group of events. Linker option interfaces are available for plug-in initialization routines and argument list event handlers. A set option interface may be used to set a linker option. The effect is the same as if the given option were present on the linker command-line. This function can take the form: void set_option(char *option, char *opt_parm). The option parameter contains the option sentinel character (e.g., '−' or '+'), followed immediately by the option letter(s). If the option requires a secondary parameter, it can be given as the opt_parm parameter; otherwise, the second parameter should be NULL. If a set option interface is called to add a library search option during the handling of an input file name or input library event, the new input library name is added before (or in place of, depending on the disposition) the file name for which the event was delivered. No events are delivered to the plug-in 110 for the new file name.

An add file name interface may be used to add a new file name to the linker argument list. This may be an additional file name, or a replacement for an existing file name listed on the original command line. This interface can take the form: void set_option(char *option, char *opt_parm). If called during the handling of an input file name or input library event, the new input file name is added before (or in place of, depending on the disposition) the file name for which the event was delivered. No events are delivered to the plug-in 110 for the new file name.

Linker symbol table interfaces can also be provided to allow the plug-in 110 to make inquiries of the linker's global symbol table 130. A symbol table iterator interface provides sequential access to the linker symbol table. This interface can take the form: plugin_symbol_iterator_t get_symbol_iterator(). The iterator interface provides access to linker symbol structures which can be queried about various symbol properties such as whether a symbol is a function or a data, whether it is defined or undefined, whether it is defined statically or dynamically, whether it is a common symbol, whether it has linkage table entries, whether it has static and/or dynamic references, whether a symbol is hidden/protected/preemptible, etc.

Various other interfaces can be provided. In particular, several symbol interfaces may be provided that can be called by the compiler 106 to obtain information about individual symbols from the linker global symbol table 130. These interfaces may, for instance, take the form of one or more of the following: a get the name of the symbol interface (const char* get_name() const); an is this a function symbol interface (int is_function() const); an is this a data symbol interface (int is_data() const); an is the symbol from an instrumented object file interface (int is_ifile_symbol() const); a does symbol have global binding interface (int is global() const); a does symbol have weak binding interface (int is_weak() const); an is the symbol statically defined interface (int is_statically_defined() const); an is the symbol dynamically defined interface (int is_dynamically_defined() const); an is statically or dynamically defined interface (int is_defined() const); an is the symbol undefined interface (int is_unsat() const); an is symbol referenced from within the module interface (int has_static_reference() const); an is symbol referenced by another load module interface (int has_dynamic_reference() const); an is symbol referenced from within the module or by another load module interface (int has_reference() const); a can symbol be pre-empted by another definition at run time interface (int is_preemptible() const); an is the definition hidden interface (int is_hidden() const); an is the definition protected interface (int is_protected() const); a does symbol have a dlt entry interface (int has_dlt() const); a get symbol size interface (unsigned long long get_size() const); an is this a common symbol interface (int is_common() const); an is this an ansi common symbol interface (int is_ansi_common() const); and an is this a TLS (thread local) common symbol interface (int is_tls_common() const).

Figure 2:
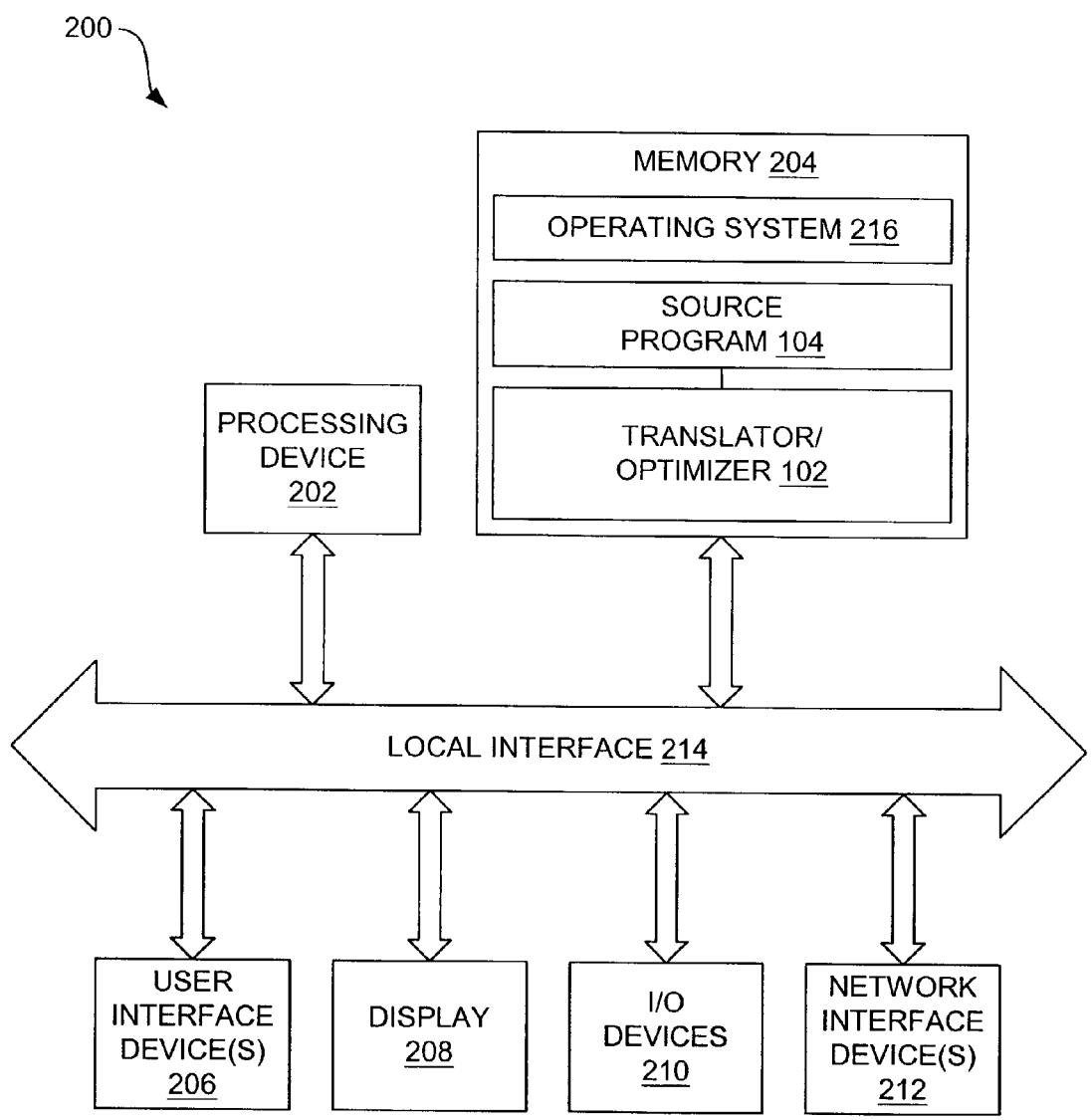
FIG. 2 is a block diagram of an example computer system on which a translator/optimizer shown in FIG. 1 can execute.

FIG. 2 is a schematic view illustrating an example architecture for a computer system 200 on which the translator/optimizer 102 can execute. Generally speaking, the computer system 200 can comprise any one of a wide variety of wired and/or wireless computing devices, such as a desktop computer, portable computer, dedicated server computer, multi-processor computing device, cellular telephone, personal digital assistant (PDA), handheld or pen-based computer, and so forth. Irrespective its specific arrangement, the computer system 200 can, for instance, comprise a processing device 202, memory 204, one or more user interface devices 206, a display 208, one or more input/output (I/O) devices 210, and one or more networking devices 212, each of which is connected to a local interface 214.

The processing device 202 can include any custom made or commercially available processor, a CPU or an auxiliary processor among several processors associated with the computer system 200, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the computing system.

The memory 204 can include any one of a combination of volatile memory elements (e.g., random access memory (RAM, such as DRAM, SRAM, etc.)) and nonvolatile memory elements (e.g., ROM, hard drive, tape, CDROM, etc.). The memory 204 typically comprises an O/S 216, the source program 104, and the translator/optimizer 102, which has already been described in detail. Persons having ordinary skill in the art will appreciate that the memory 204 can comprise other components which have been omitted for purposes of brevity.

The one or more user interface devices 206 comprise those components with which the user can interact with the computing system 200. For example, where the computing system 200 comprises a personal computer (PC), these components can comprise a keyboard and mouse. Where the computing system 200 comprises a handheld device (e.g., PDA, mobile telephone), these components can comprise function keys or buttons, a touch-sensitive screen, a stylus, etc. The display 208 can comprise a computer monitor for a PC or a liquid crystal display (LCD) for a handheld device.

With further reference to FIG. 2, the one or more I/O devices 210 are adapted to facilitate connection of the computing system 200 to another system and/or device and may therefore include one or more serial, parallel, small computer system interface (SCSI), universal serial bus (USB), IEEE 1294 (e.g., Firewire™), and/or personal area network (PAN) components. The network interface devices 212 comprise the various components used to transmit and/or receive data over a network. By way of example, the network interface devices 212 include a device that can communicate both inputs and outputs, for instance, a modulator/demodulator (e.g., modem), wireless (e.g., radio frequency (RF)) transceiver, a telephonic interface, a bridge, a router, network card, etc.

Various programs (software and/or firmware) have been described herein. It is to be understood that these programs can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

The general nature of the system 100 having been described above, an example of operation of the system will now be discussed with reference to FIGS. 3 and 4. In describing this operation, flow diagrams are provided. It is to be understood that any process steps or blocks in this disclosure represent modules, segments, or portions of code may include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 3:
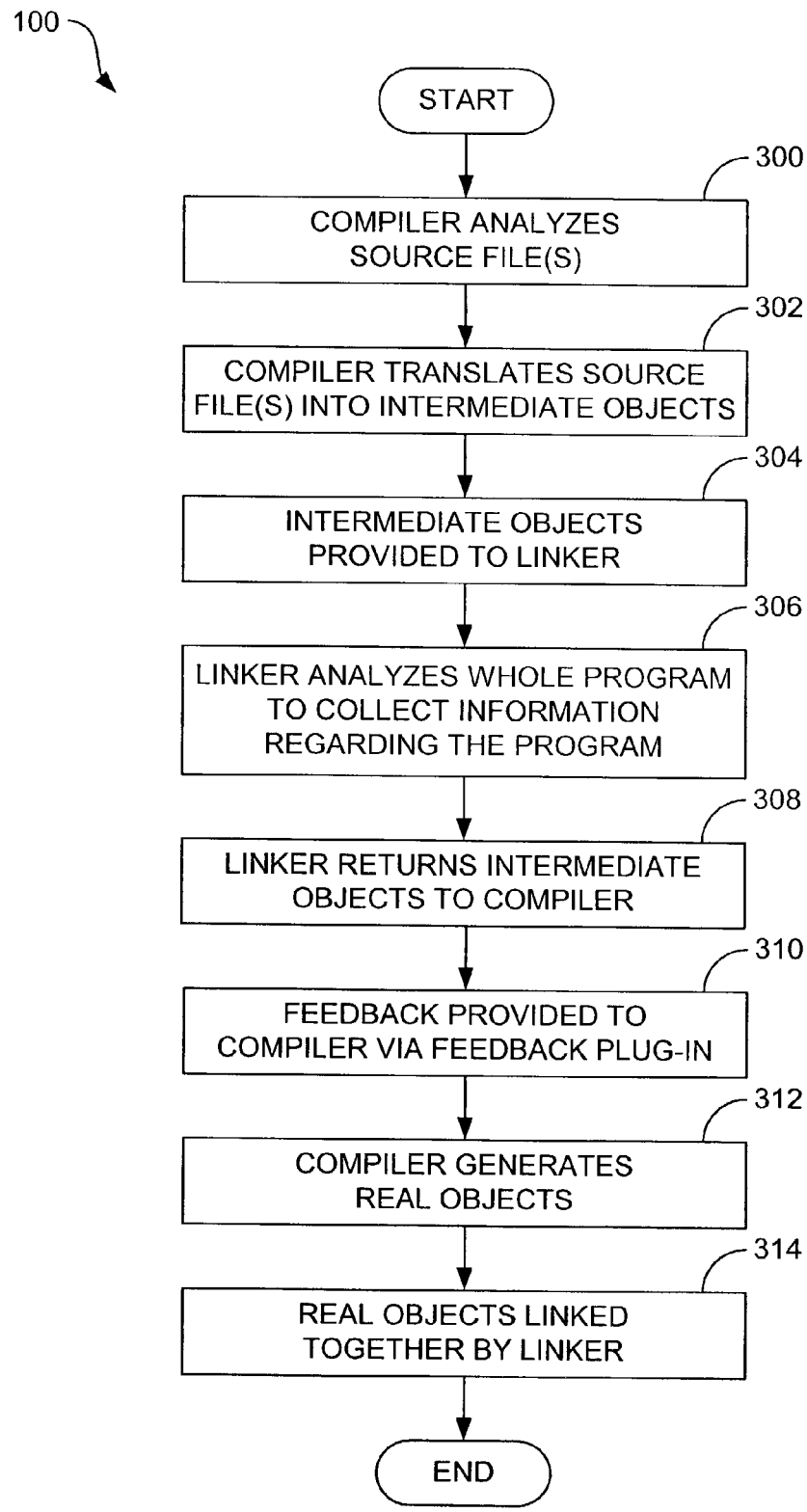
FIG. 3 is a flow diagram that illustrates a first example of operation of the translator/optimizer in compiling and optimizing a source program.

FIG. 3 illustrates a high-level example of operation of the translator/optimizer 102 in providing whole program analysis. Beginning with block 300, the compiler 106 analyzes the source files 112 that have been provided to the compiler for compilation. Through this analysis, the compiler 106 translates the source files 112 into intermediate objects, as indicated in block 302, and these intermediate objects are provided to the linker 108, as indicated in block 304. The linker 108 analyzes the whole program including the intermediate objects, all libraries, and real objects to collect information about the program that will be provided to the compiler 106 so that the program can be optimized in some manner during the final compilation process.

Next, with reference to block 308, the linker 108 returns the intermediate objects to the compiler 106, and, as indicated in block 310, feedback is provided to the compiler via the feedback plug-in 110, the feedback comprising at least part of the information gleaned by the linker during the analysis conducted in block 306. Once this feedback has been provided to the compiler 106, the compiler completes the translation of the intermediate objects to generate real objects, as indicated in block 312. At this point, the real objects are linked together by the linker 108 to produce an executable program, as indicated in block 314.

Figure 4A:
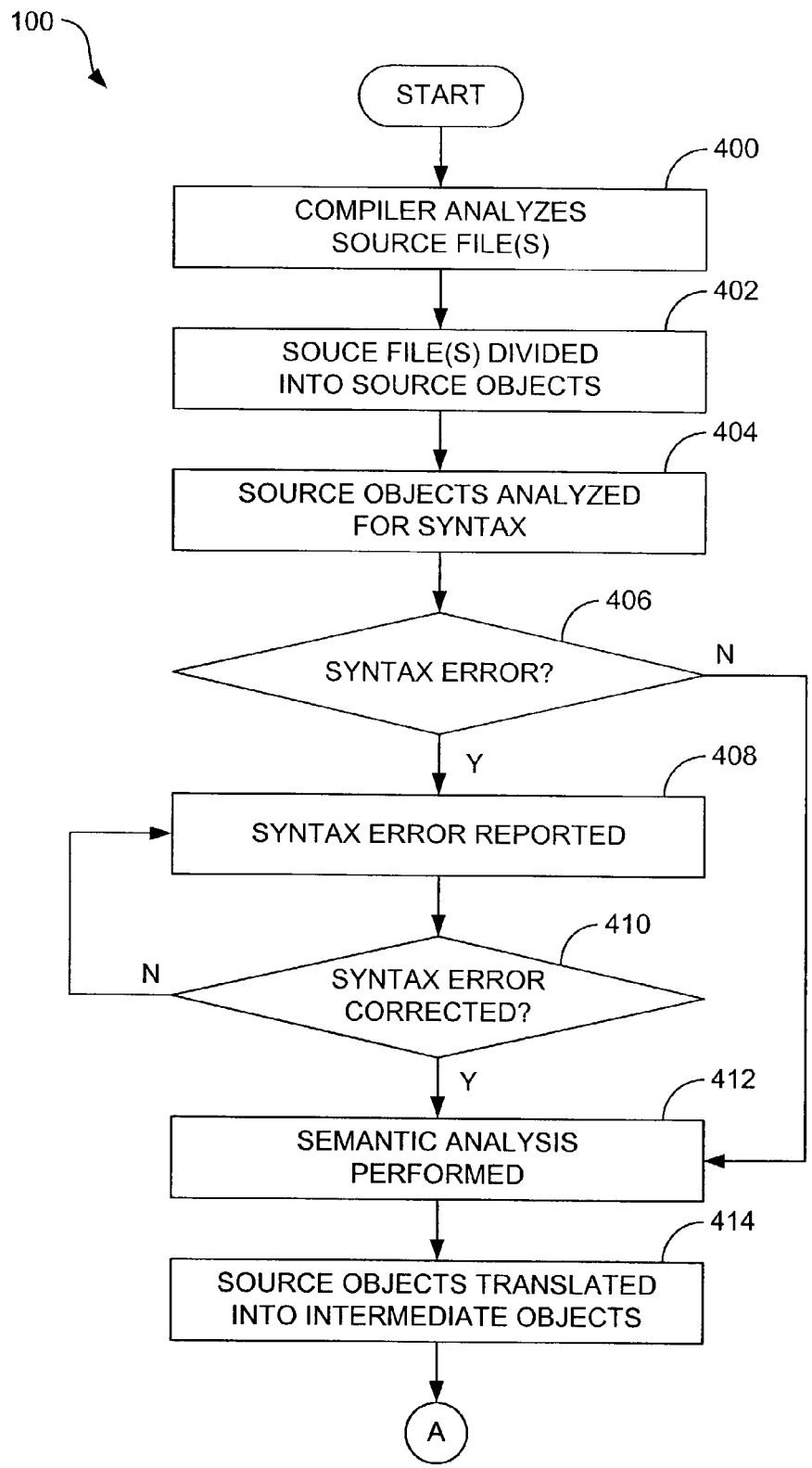
FIGS. 4A-4C provide a flow diagram that illustrates a second example of operation of the translator/optimizer in compiling and optimizing a source program.
Figure 4B:
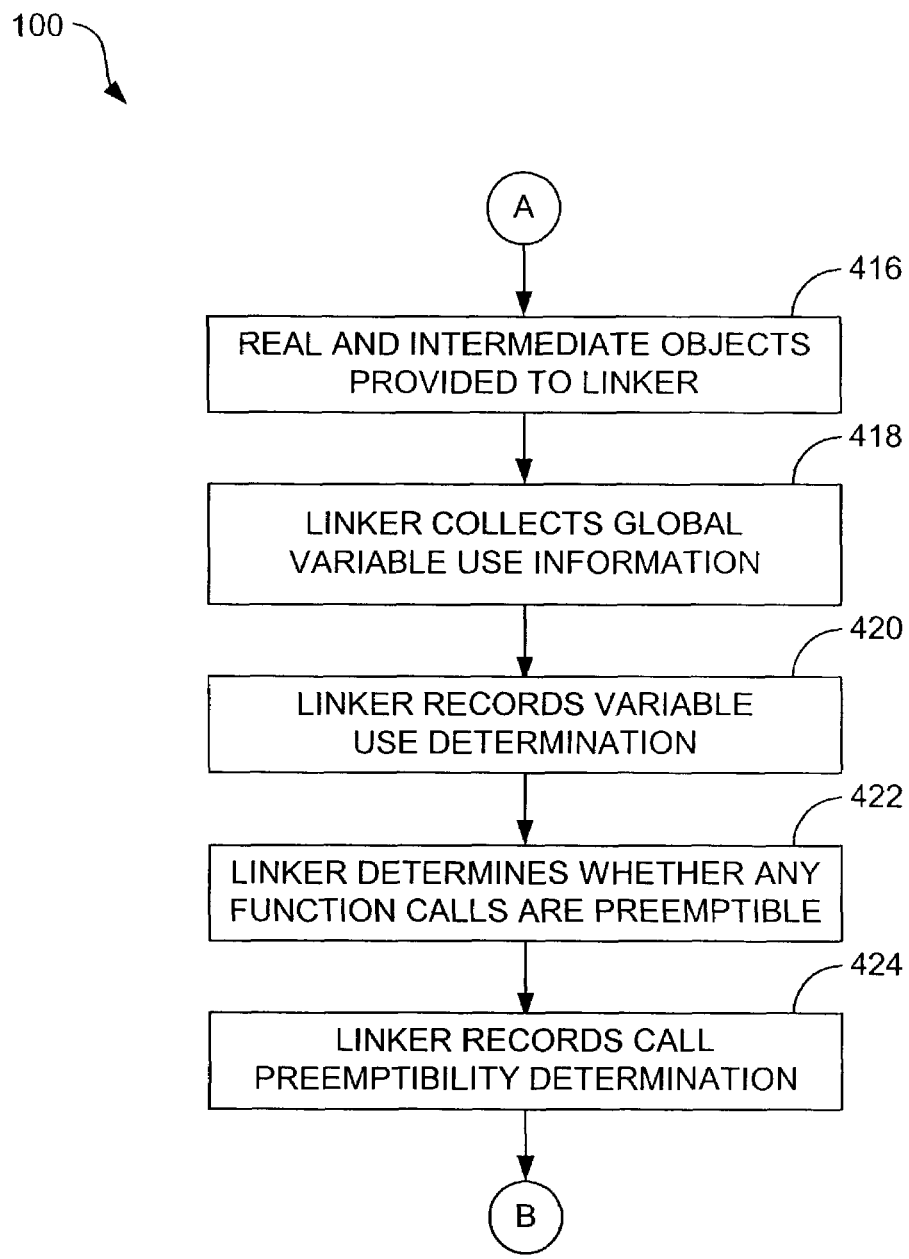

FIG. 4 provides a more detailed example of operation of the translator/optimizer 102 in providing whole program analysis. More particularly, FIG. 4 provides an example of the translator/optimizer 102 in providing various different optimizations through whole program analysis. Beginning with block 400 of FIG. 4A, the compiler 106 first analyzes source files 112 so as to divide the source files into various source objects, as indicated in block 402, and classifies them as operators, constants, separators, or identifiers. Next, with reference to block 404, the compiler 106 analyzes the source objects for syntax. During this process, the grammatic structure of the program is analyzed to determine if it contains any syntax errors, and the various source objects are arranged into a syntax tree to denote the program's syntactic structure.

With reference to decision block 406, if no syntax errors are detected by the compiler 106, flow continues down to block 412 described below. If, on the other hand, one or more syntax errors are detected, flow continues to block 408 at which the syntax errors are reported to the user so that they may be corrected. With regard to decision block 410, if the syntax errors are corrected, flow continues to block 412; otherwise flow returns to block 408 at which the remaining (or any new) syntax errors are reported. At block 412, the compiler 106 performs semantic analysis on the source objects during which one or more flow graphs, call graphs, and tables may be generated.

The compiler 106 next translates the source objects into an intermediate representation to produce intermediate objects, as indicated in block 414. With reference to block 416 of FIG. 4B, the real and intermediate objects are then provided to the linker 108. Of these objects, only the intermediate objects are provided, and therefore known, by the compiler 106. With access to all real and intermediate objects, the linker 108 can, as indicated in block 418, collect global variable use information that may be provided to the compiler 106 for purposes of optimizing the program. Specifically, the linker 108 determines whether a global variable is referenced in an existing library or real object unknown to the compiler. As is discussed below, this global variable reference information can be used to perform many compiler optimizations.

If a global variable is referenced, its address could potentially be taken and stored into a pointer variable. If a variable is not referenced, however, the variable's address is not exposed, and the variable may only be accessed using the variable's name. In such a scenario, an indirect register store by a pointer function will not invalidate a value set for the global variable, and the program may be optimized by reusing the values loaded into the register for the variable to reduce memory access operations.

The compiler can use the global symbol reference information to perform global constant variable elimination optimization.

If a given global variable is not so referenced, it may never change and therefore is a candidate for replacement with a constant (i.e., its initialized value). If permissible, such a replacement would both increase execution speed and free memory that otherwise would be required for any instructions and addresses required by such variables.

Once the global variable reference is collected, the linker 108 records the variable reference (e.g., use) information, as indicated in block 420, typically by updating the linker global symbol table 130.

Next, in block 422, the linker 108 determines whether any calls to any functions are preemptible. In particular, the function call analysis module 128 of the linker 108 conducts symbol resolution analysis to determine as to functions defined in library or real object, whether the calls to the functions are preemptible or not preemptible. In the former case, the compiler 106 may inline a function call stub in the function call site to reduce the number of branch instructions (jumps) required to access the function, thereby reducing execution time. Once this determination is made, the function call preemptibility determination is recorded, as indicated in block 424, typically by again updating the linker global symbol table 130.

Figure 4C:
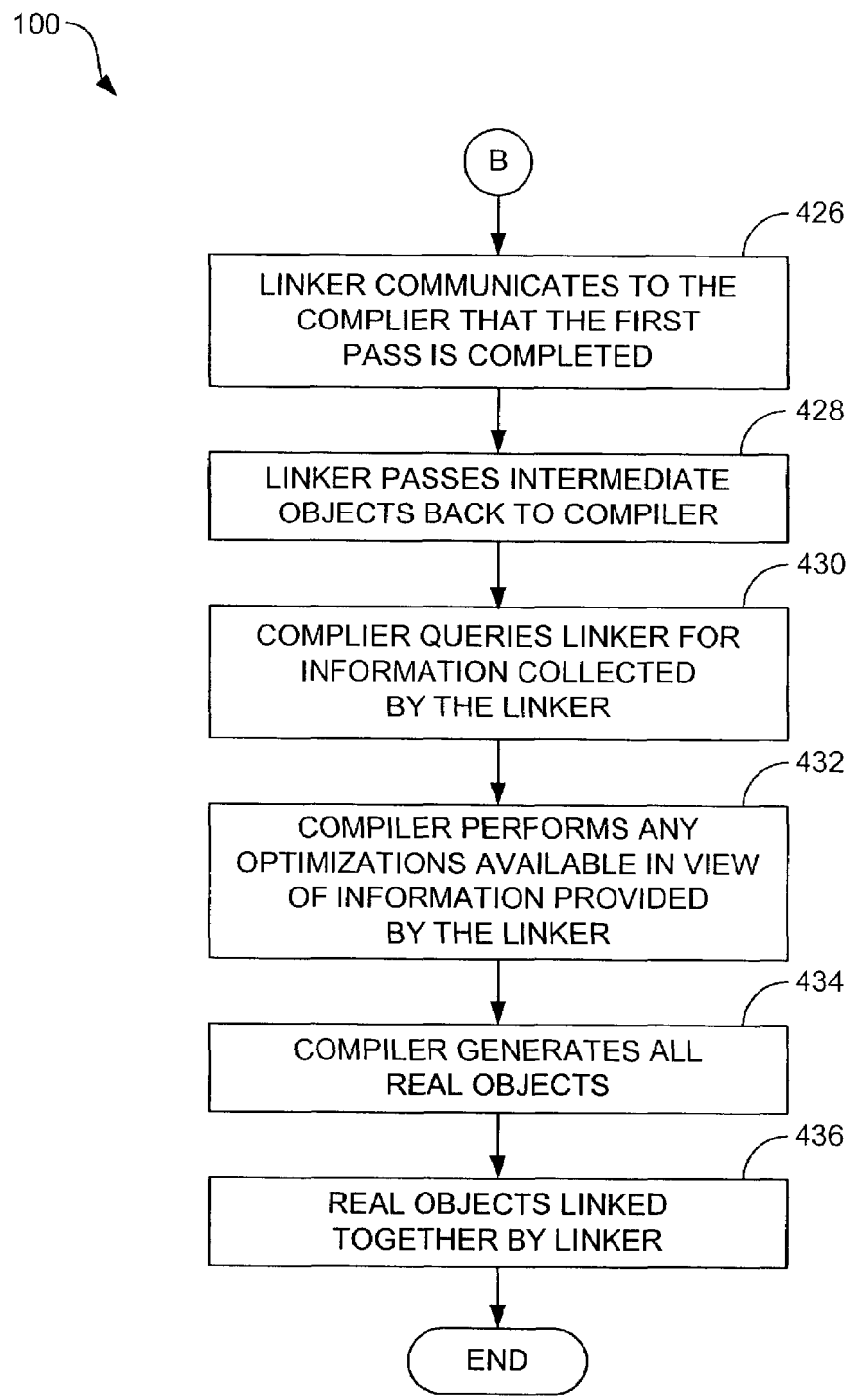

At this point, with reference to block 426 of FIG. 4C, the linker 108 communicates to the compiler 106, via the feedback plug-in 110, that the first pass analysis is complete, thereby indicating that the whole program analysis has been conducted and that various pieces of information regarding the whole program are available to the compiler for use in the final phase of program compilation. Once this communication has been sent by the linker 108, the linker passes the intermediate objects to the compiler 106, as indicated in block 428, and, when the information collected by the linker is needed, the compiler 106 queries the linker for the various information, as indicated in block 430. As identified above, this information can be provided to the compiler 106 with the global symbol table 130 that has been generated by the linker 108. To obtain this table 130, the compiler 106 calls the plugin_symbol_iterator_t get_symbol_integrator() linker callback of the plug-in 110 using the compiler function pointers 114.

Next, in block 432, the compiler 106 performs any optimizations that are available in view of the information provided by the linker 108, i.e. recorded in the linker global symbol table 130. The nature of the optimizations depend upon the determinations that have been made by the linker 108 in the foregoing. Each type of optimization is described below.

Global Address Exposure Analysis

If the linker 108 determines that given global variables are not referenced in an existing library or real object, i.e. the variables' addresses are not exposed, the compiler 106 may, pending further analysis, optimize the program such that the values loaded into the register for those global variables are reused. In such a case, the compiler 106 analyzes the remaining intermediate objects to determine if the variable's address are likewise not exposed there. If not exposed, the optimization is feasible.

The nature of this optimization may be explained through a simplified example. Assume a first instruction requires the calculation "x+y." In such a case, values for x and y are read from memory and saved into registers. Assume next that an indirect store, *p, is executed. If a second instruction is later encountered that requires "x−y," values for x and y must again be read from memory and saved into registers if the variables are exposed because it is not known whether the memory locations that the variables represent have been modified. If it is known that the variables are not exposed, however, the values previously stored in the registers for x and y may be reused in that they will not have been invalidated by the indirect store. Therefore, a further load is avoided. In that such loads are relatively slow due to the latency between the time when the load is initiated and the time when the value is actually available in the register, execution speed can be significantly increased by reusing the values already available in the registers.

Global Constant Variable Recognition

If the linker 108 determines that given global variables are not referenced in a library or real object, the variables may never change and the compiler 106 may treat those global variables as candidates for replacement with constants. Accordingly, the compiler 106 then analyzes all remaining intermediate objects to determine whether the global variables are modified therein. If not, the global variables may be replaced with their initialized values so as to reduce the number of instructions that must be executed at runtime. To cite a simple example, if a given instruction requires "x+y," and x and y are not modified anywhere in the program, the values may be replaced by their initialized values. If these values are 1 and 2, respectively, the instruction becomes "1+2." The replacement of the variables therefore yields a further layer of optimization in that the instruction may simply be replaced with the constant "3." Not only does such optimization increase execution speed, it also reduces memory requirements by eliminating instructions and freeing memory addresses used to store the variable values.

Global Dead Store Elimination

If the linker 108 determines that any global variables are not referenced (i.e., not used), the variables are candidates for elimination. Therefore, the compiler 106 can then analyze the remaining intermediate objects to determine whether those variables are used therein. If not, all instructions or portions of instructions associated with the variables may be discarded. Again, this optimization both speeds program execution (by removing instructions) and frees memory space.

External Function Call Optimization

If the linker 108 determines that a function call is preemptible, the compiler 106 may optimize the program by inlining function call stubs in the function call sites. In conventional program compilation, if a compiler encounters a given function, the compiler generates a branch statement to create a branch to the function's entry point. At link time, if a linker finds that the function is defined in a library or real object, the linker will create a function call stub so that, during execution, the program will first branch into the stub and the stub will route the call to the definition contained in the library or other program feature. Therefore, two branches are conventionally needed to access the function. In the present system, however, if the compiler 106, via information provided by the linker 108, knows at compile time that the function is defined in the library or other feature, the compiler may inline the stub into the function call site to avoid the branch to the stub to thereby reduce the number of branch instructions that are necessary. In such situations, execution time is reduced, thereby optimizing the program.

After all such optimizations have been performed, the compiler 106 then generates all real objects, as indicated in block 434. At this point, the real objects are then linked together by the linker 108, as indicated in block 436, to produce an executable, optimized program. Due to the optimizations, the resultant program can be executed with greater speed and may require less memory.

A program optimization method is summarized in the flow diagram 500 of FIG. 5. As indicated in this figure, an optimization method comprises analyzing a program to gather information regarding one or more of (a) global variables used in the program, and (b) a call to a function of the program (502). A next step comprises providing the information to a compiler (504). A further step then comprises compiling the program with the compiler in view of the gathered information so as to optimize the program (506).

The invention claimed is:

1. A method performed by a translator/optimizer, the method comprising:
analyzing the program to gather information regarding global variables used in the program including portions of the program to which a compiler has no access;
providing the information gathered about the global variables to the compiler that is to compile the program; and
compiling the program with the compiler in view of the gathered information so as to optimize the program.

2. The method of claim 1, wherein the portions comprise object files contained in a pre-existing library to which the compiler has no access.

3. The method of claim 1, wherein analyzing the program comprises analyzing the program using a linker that receives intermediate objects from the compiler.

4. The method of claim 1, wherein providing the information comprises providing the information to the compiler via a feedback plug-in that includes an interface that can be called by the compiler.

5. The method of claim 4, wherein providing the information further comprises providing the information to the compiler in a linker global symbol table.

6. The method of claim 1, wherein compiling the program includes at least one of reusing values loaded into a register for a global variable, replacing a global variable with a constant, and eliminating a global variable.

7. A method for optimizing a program, comprising:
analyzing the program to gather information regarding a call to a function of the program including portions of the program to which a compiler has no access;
providing the information gathered about the function call to the compiler that is to compile the program; and
compiling the program with the compiler in view of the gathered information so as to optimize the program.

8. The method of claim 7, wherein the portions comprise object files contained in a pre-existing library to which the compiler has no access.

9. The method of claim 7, wherein analyzing the program comprises analyzing the program using a linker that receives intermediate objects from the compiler.

10. The method of claim 9, wherein analyzing the program further comprises analyzing the program to determine whether a call to a function is preemptible.

11. The method of claim 7, wherein providing the information comprises providing the information to the compiler via a feedback plug-in that includes an interface that can be called by the compiler.

12. The method of claim 7, wherein compiling the program comprises inlining a stub into a call site of the function.

13. A method for optimizing a program, comprising:
translating source objects of the program into intermediate objects using a compiler;
providing the intermediate objects to a linker;
analyzing portions of the program about which the compiler has no access using the linker;
updating a global symbol table with information obtained during the analysis;
passing the intermediate objects back to the compiler;
providing information contained in the linker global symbol table to the compiler; and
translating the intermediate objects into machine objects with the compiler in reference to the information contained in the linker global symbol table so as to optimize the program.

14. The method of claim 13, wherein providing information comprises providing the information to the compiler via a feedback plug-in that includes interfaces that can be called by the compiler and by a linker.

15. A system for optimizing a program, comprising:
a processing device;
linking means executable by the processing device for analyzing portions of the program inaccessible to compiling means to determine information that can be used to optimize the program;
compiling means executable by the processing device for compiling the program in view of the information determined by the linking means; and
feedback means executable by the processing device for providing the information determined by the linking means to the compiling means for reference during compilation so that the program can be optimized.

16. The system of claim 15, wherein the feedback means comprises a feedback plug-in that includes interfaces that can be called by the compiling means and the feedback means.

17. A system for optimizing a program, comprising:
a processing device;
a compiler executable by the processing device to translate source objects of the program into intermediate objects;
a linker executable by the processing device to analyze portions of the program about which the compiler has no access to derive information relevant to program optimization; and
a feedback plug-in executable by the processing device that includes interfaces that can be called by the compiler and the linker, the feedback plug-in facilitating communication of the derived information to the compiler.

18. The system of claim 17, wherein the linker is configured to determine whether a global variable is referenced by another variable.

19. The system of claim 17, wherein the compiler is configured to reuse a value loaded into a register for a global variable.

20. The system of claim 17, wherein the compiler is configured to replace a global variable with a constant.

21. The system of claim 17, wherein the compiler is configured to eliminate a global variable.

22. The system of claim 17, wherein the compiler is configured to inline a stub into a call site of a program function.

23. The system of claim 17, wherein the linker is configured to store the derived information in a linker global symbol table that may be accessed by the compiler.

24. A translator/optimizer stored on a computer memory, executable by a processing device for optimizing a program, comprising:
translator logic configured to translate source objects of the program into intermediate objects and translate intermediate objects into real objects;
linking logic configured to receive intermediate objects from the translator logic and to analyze portions of the program to which the translator logic has no access to obtain information that may be used to optimize the program; and
communication logic configured to facilitate communication of the obtained information to the translator logic.

25. A plug-in for facilitating program optimization, stored on a computer memory, executable by a processing device, comprising:
a plurality of interfaces that can be called by function pointers of a compiler and a linker, including
(a) a first interface facilitating communication to the compiler that a first pass of the linker has been completed to thereby indicate that analysis has been performed on the program, including any portions inaccessible to the compiler, to collect information relevant to program optimization in a linker global symbol table, and
(b) a second interface facilitating communication to the linker to provide the collected information to the compiler;
wherein the compiler can then compile the program using the information collected from the linker so as to optimize the program.

* * * * *